United States Patent [19]
Selmeczi

[11] 3,919,393
[45] Nov. 11, 1975

[54] PROCESS FOR SULFUR DIOXIDE REMOVAL FROM COMBUSTION GASES

[75] Inventor: Joseph G. Selmeczi, Pittsburgh, Pa.

[73] Assignee: Dravo Corporation, Pittsburgh, Pa.

[22] Filed: Mar. 8, 1973

[21] Appl. No.: 339,426

[52] U.S. Cl. .............................................. 423/242
[51] Int. Cl.² ........................................ C01B 17/00
[58] Field of Search ........................... 423/242, 244

[56] References Cited
UNITED STATES PATENTS

| | | | |
|---|---|---|---|
| 3,343,908 | 9/1967 | Wickert | 423/244 |
| 3,520,649 | 7/1970 | Tomany et al. | 423/244 |
| 3,632,306 | 1/1972 | Villiers-Fisher et al. | 423/242 |
| 3,699,037 | 10/1972 | Annesser et al. | 423/244 |

Primary Examiner—Oscar R. Vertiz
Assistant Examiner—Gregory A. Heller
Attorney, Agent, or Firm—Parmelee, Miller, Welsh & Kratz

[57] ABSTRACT

An improved process for the removal of sulfur dioxide from gases resulting from combustion of sulfur-containing fuels such as coal, with the gases passed through a wet scrubber to which there is added an aqueous solution of calcium oxide containing 2–10% magnesium oxide, whereby the effeciency of sulfur dioxide removal in the scrubber is increased and scaling reduced therein.

10 Claims, 1 Drawing Figure

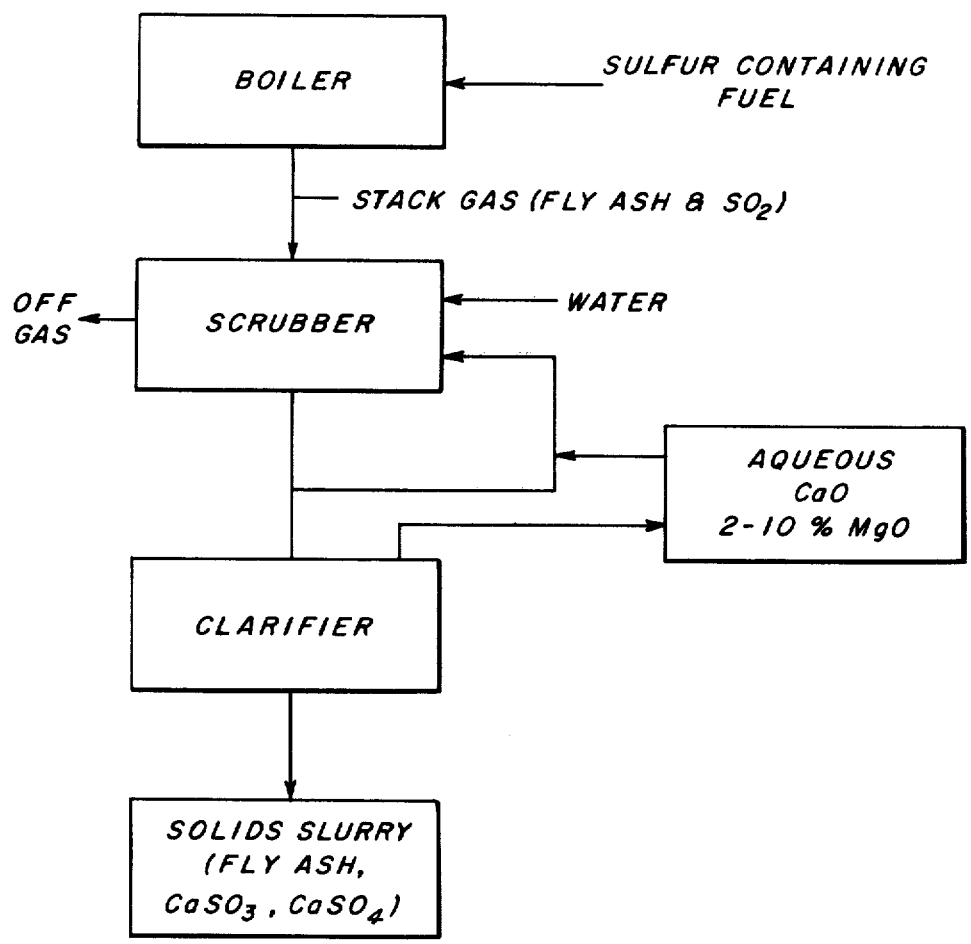

PROCESS FOR SULFUR DIOXIDE REMOVAL FROM COMBUSTION GASES

BACKGROUND OF THE INVENTION

Generally, the combustion of fuels containing sulfur, such as sulfur-containing coals, produces sulfur dioxide which had previously been discharged into the atmosphere. Stringent regulation of sulfur dioxide emission has come about at the time when the sources of low sulfur content coals are diminishing, resulting in the need to use high-sulfur containing coals and to remove the sulfur either prior to combustion or as sulfur dioxide from the stack gases following combustion, the latter being the preferred method to date.

Stack gases from the combustion of sulfur-containing coals contain fly ash and sulfur dioxide. Several systems have evolved for removing sulfur dioxide from stack gases, one of which is to pass the gases through a wet scrubbing system. Such wet scrubbing systems generally, in addition to effecting absorption sulfur dioxide in water, use aqueous solutions of calcium carbonate, dolomite, or lime so as to cause chemical reaction with the sulfur dioxide and increased removal of sulfur dioxide from the gases.

When calcium oxide is added as an aqueous solution to the scrubber liquid, solid calcium salts such as carbonates, sulfites and sulfates, and the like are formed. These have a limited solubility to form sulfite, carbonate and bicarbonate ions which react with the sulfur dioxide in the scrubber. Such wet calcium-containing scrubbing systems are limited in efficiency by the solubility of calcium salts in the aqueous solution. In addition, the formation of calcium sulfate in a supersaturated state in such systems creates a problem of scaling or deposition of inorganic solids in the scrubber and connected conduits which interferes with the operation of the sulfur dioxide removal system.

BRIEF SUMMARY OF INVENTION

In accordance with the present invention, gases resulting from the combustion of sulfur-containing fuels are passed to a wet scrubbing system where the gases are contacted with an aqueous solution of calcium oxide and magnesium oxide, the magnesium oxide being present in an amount of 2–10% by weight based on the total calcium oxide and magnesium oxide, and with a portion of the aqueous solution that has previously passed through the scrubber, clarified, and recycled.

BRIEF DESCRIPTION OF THE DRAWING

The drawing is a flow chart describing the process of the present invention for sulfur dioxide removal from combustion gases.

DESCRIPTION OF THE PREFERRED EMBODIMENT

Reference is made to the attached flow sheet which schematically illustrates the present process for improved sulfur dioxide removal from gases evolved upon combustion of sulfur-containing fuels. Such fuels include coal and oil, and such gases containing sulfur dioxide may also result from ore smelting operations. Fuel, such as coal, is charged to a boiler or other energy producing unit where it is combusted and where, in addition to producing heat for energy purposes, gases are evolved containing fly ash and sulfur dioxide. These gases are then passed through a wet scrubbing unit, such as a venturi-type wet scrubber, where the gases are scrubbed to remove particulate material (fly ash) as well as a required amount of sulfur dioxide prior to discharging the gases, as off gas, to the atmosphere.

In the scrubbing unit, the sulfur dioxide-containing gas is contacted with an aqueous solution of calcium salts. The gas exiting from the scrubber is clean and discharged to the atmosphere, while the aqueous solution, normally containing about 3–10% solids, is passed to a clarifier or holding tank. In the clarifier, the solids present such as fly ash, calcium sulfite, calcium sulfate, and other solids are permitted to settle so as to form a sludge material and clarified liquor in the clarifier by settling out of these solids during a predetermined holding time. The sludge material which contains the precipitated solids normally has a solids content of about 30–50% and is drained from the clarifier and discarded or further treated to form a usable material. The clarified liquor, which is the aqueous phase from the clarifier, is withdrawn from the clarifier and returned for use in the scrubbing unit, where the water of the aqueous solution is reused and any sufficient make-up water added so as to maintain the desired conditions within the scrubber.

The system as described thus far is a known system for sulfur dioxide removal having two major problems, the limited availability of carbonate, bicarbonate and sulfite ions in aqueous solutions which is a limiting chemical step in determining the efficiency of the scrubbing unit, and scaling which occurs in the scrubber which is the result primarily of calcium sulfate deposition within the scrubber, this sulfate being returned to the scrubber with saturated clarified liquor in the recycle step.

The solubility of the calcium salts in the scrubber unit is increased and the scaling occurring in the scrubbing unit decreased, I have found, by the addition of about 2–10% magnesium oxide to the calcium oxide which is added as an aqueous solution to the scrubber. The term aqueous solution as used herein, in describing the calcium oxide addition, describes a slurry of calcium oxide in water since, as is known, calcium oxide is only slightly soluble. The calcium oxide, as a slurry, is slaked lime, i.e., in the hydrate form, $Ca(OH)_2$.

While the exact chemical or physical phenomenon which occurs with the presence of magnesium oxide in addition to calcium oxide is not understood, it is postulated that the effect of the magnesium oxide in controlled amounts is to increase the ionic strength in the solution and increase the solubility of the calcium salts therein. Such an action may affect the amount of dissolved calcium salts present in the scrubbing solution that is available to react with sulfur dioxide which would increase the rate of reaction and efficiency of the scrubbing unit, and at the same time decreasing scale formation. The result, however, is an efficient and economical process which may be carried out in existing wet scrubbing units, thus requiring little capital expenditure for an improved anti-pollution technique.

The addition of less than about 2% magnesium oxide to the calcium oxide solution does not appear to have an appreciable effect upon the scrubber efficiency, while the addition of greater than about 10% of magnesium oxide has an effect but merely leads to other problems such as the presence of excess dissolved magnesium sulfites and sulfates which need to be precipitated in the clarifying unit by further additions of lime.

The addition of the specified amount of magnesium oxide to the calcium oxide used in the scrubbing unit may be effected by blending of material in a kiln for producing the required slurry, such as by mixing predetermined amounts of dolomitic lime to high calcium lime to achieve the desired ratio. Some natural deposits of limestone with a high concentration of carbonates and a magnesium to calcium ratio in the above-described ranges or blending high calcium limestone with dolomitic stone may be processed, or magnesium oxide blended with calcium oxide in a lime slurry feed tank.

As an example of the effect of the addition of a controlled amount of magnesium oxide to calcium oxide solutions added to a scrubbing unit, the following experiments were carried out.

Experiments were made using six different lime compositions in a wet scrubbing unit. The chemical analysis of six lime compositions were taken (wherein $R_2O_3$ represents minor quantities of metal oxides other than those listed). The analysis of the six lime compositions showed them to contain:

| Composition (%) | A | B | C | D | E | F |
| --- | --- | --- | --- | --- | --- | --- |
| Available Lime | 92.2 | 90.2 | 90.4 | 91.8 | 87.5 | 82.7 |
| CaO Total | 96.1 | 94.2 | 94.2 | 94.8 | 93.4 | 90.5 |
| Loss on Ignition | 1.2 | 3.0 | 3.0 | 1.0 | 3.5 | 3.0 |
| $SiO_2$ | 1.4 | 1.35 | 1.3 | 1.8 | 2.9 | 2.0 |
| $R_2O_3$ | 0.9 | 0.85 | 0.8 | 1.2 | 1.4 | 2.6 |
| MgO | 0.6 | 0.55 | 0.6 | 1.0 | 0.9 | 4.3 |
| Physical State | Pebble | Pebble | Fines | Pebble | Pulverized | Ground Pebble |
| Particle Size | 35% + ½" 55% 8M × ½" | 10% + ¼" 80% 30M × ½" | 1% + 4M 86% 200 × 4M | 15% + ⅜" 75% ¼ × ⅜" | 5% + 100M 30% 200 × 100M | 2% + 30M 37% 325 × 30M |

The experiments using the various lime compositions were conducted as follows:

Flue gas from a coal burning boiler, at a temperature of about 275°F., and a flow rate of 1475 cubic feet per minute, and containing generally 1234 ppm of $SO_2$, 5.71 grains dust per cubic foot was passed through a venturi-type scrubber (stage one separator) where the gas was contacted with a flow of lime solution (60 gallons per minute). The lime solution was discharged from the stage one separator to a stage one recycle tank. The flue gas, at a temperature of about 127°F. was then directed to a second venturi-type scrubber (stage two separator) where the gas was contacted with a second flow of lime solution at 60 gallons per minute. The cleaned flue gas was exited from the system, the temperature of the gas being about 114°F. The lime solutions (each formed from the desired lime) added to the separators were prepared by forming a slaked lime solution containing between 1.1–1.6% $Ca(OH)_2$ in water (combined with thickener overflow as hereafter described) at a rate of about 2.7 gallons per minute to recycle tanks of the separators. This 2.7 gallons per minute of solution was apportioned with about 1.2 gallons per minute fed to the recycle tank of the stage two separator which recycled 60 gallons per minute of solution through the stage two venturi scrubber where it was combined with scrubber fluid and passed from the stage two separator recycle tank to the stage one separator recycle tank at 1.2 gallons per minute. The stage one recycle tank recycled 60 gallons per minute of solution through the stage one venturi scrubber. The stage one recycle tank also had added thereto the other portion or 1.5 gallons per minute of lime solution. The pH of the discharge from the stage two separator recycle tank was about 7.4, and that discharged from the stage one separator recycle tank at a pH of about 6.6.

Withdrawn from the discharge line of the stage one recycle tank was about 2.2 gallons per minute of solution (about 5% solids), this withdrawn portion being fed to a thickener or clarifier. In the thickener, solids were settled, with overflow fed to the lime feed tanks at a rate of 1.9 gallons per minute and with underflow or thickened portions (about 0.3 gallons per minute and 44% solids) removed as waste.

Comparable experiments were run using the above-described system, with the various limes substituted and the scrubbing efficiency of the various lime slurries determined at lime stoichiometric ratios of 105, 110, 115, 120, 135 and 150% (at the $CaO/SO_2$ inlet to the scrubber), the $SO_2$ removal efficiencies being listed in Table I:

TABLE I

Scrubbing Efficiencies of Lime Slurries
Lime Stoichiometry (%) $CaO/SO_2$ Inlet

| | $SO_2$ Removal (%) | | | | | |
| --- | --- | --- | --- | --- | --- | --- |
| | 105 | 110 | 115 | 120 | 135 | 150 |
| Lime A | 73 | 75 | 76 | 77 | 79 | 82 |
| Lime B | 76.5 | 77 | 77.5 | 78 | 79 | 81 |
| Lime C | 69 | 70 | 71 | 72 | 75 | 78 |
| Lime D | 78 | 78.5 | 78.5 | 79 | 80 | 81 |
| Lime E | 70.5 | 71 | 71.5 | 72 | 73.5 | 75 |
| Lime F | 78 | 79 | 80 | 81 | 84 | 87 |

As can be seen from the percent $SO_2$ removed, the lime slurry containing the required amount of magnesium oxide, Lime F, showed improved results over the other lime slurries used at most stiochiometric ratios even in view of the relatively high silica content of the lime and the 82.7 available lime in the starting material. Limes with the required magnesium oxide content and the lower silica and higher available lime would be expected to be even more effective in improving scrubber efficiency.

The process enables improvement of the efficiency of sulfur dioxide scrubbing units, with use of a lime slurry containing a predetermined amount of magnesium oxide. Even small improvements in efficiency can be critical where a set standard is required by the pollution standards, and a difference of a few percentages in efficiency can mean the violation or adherence to such standards.

I claim:

1. In a process for removing sulfur dioxide from gases resulting from the combustion of sulfur-containing fuels wherein the gases are subjected to a wet scrubbing step by contact with an aqueous solution of calcium oxide and a portion of the aqueous solution previously passed through said scrubber and clarified, with an effluent removed therefrom, the improvement comprising eliminating the formation of scale within said scrubber while minimizing the amount of dissolved magnesium sulfite and sulfate within the effluent by adding to said aqueous solution of calcium oxide 2–10% by weight of magnesium oxide, based on the total amount of calcium oxide and magnesium oxide.

2. The process defined in claim 1 wherein said aqueous solution is in the form of slaked lime and wherein said magnesium oxide is admixed with said slaked lime.

3. The process defined in claim 1 wherein said magnesium oxide is present in an amount of 4–8% based on the total amount of calcium oxide and magnesium oxide.

4. The process defined in claim 1 wherein said aqueous solution of calcium oxide containing said magnesium oxide is combined with said portion of the aqueous solution previously passed through said scrubber and clarified, and said combined solutions are charged to said scrubber.

5. The process defined in claim 1 wherein said sulfur containing fuel is coal, and said gases from said combustion contain fly ash in addition to sulfur dioxide.

6. The process defined in claim 1 wherein said sulfur containing fuel is oil.

7. The process defined in claim 1 wherein said gases containing sulfur dioxide are produced by smelting operations for ores.

8. The process defined in claim 1 wherein said aqueous solution containing said magnesium oxide in an amount of 2–10% by weight is formed by admixing dolomitic lime and high calcium lime in predetermined amounts.

9. The process defined in claim 1 wherein said aqueous solution containng said magnesium oxide in an amount of 2–10% by weight is formed by adding to water a lime product resulting from calcining of limestone containing a predetermined amount of magnesium carbonate and calcium carbonate so as to produce said oxides.

10. The process defined in claim 1 wherein said aqueous solution containing said magnesium oxide in an amount of 2–10% by weight is formed by blending of dolomitic stone and high-calcium limestone to form a mixture and calcining said blended mixture so as to produce said oxides.

* * * * *